(12) United States Patent
Mainzer et al.

(10) Patent No.: US 10,801,657 B2
(45) Date of Patent: Oct. 13, 2020

(54) DETACHABLE SYSTEM TO SHUT OFF PRESSURE FLOW IN PIPES

(71) Applicant: OPERATIONS TECHNOLOGY DEVELOPMENT, NFP, Des Plaines, IL (US)

(72) Inventors: Jeffery W. Mainzer, Cary, IL (US); Dennis R. Jarnecke, River Forest, IL (US)

(73) Assignee: OPERATIONS TECHNOLOGY DEVELOPMENT, NFP, Des Plaines, IL (US)

(*) Notice: Subject to any disclaimer, the term of this patent is extended or adjusted under 35 U.S.C. 154(b) by 100 days.

(21) Appl. No.: 15/903,708

(22) Filed: Feb. 23, 2018

(65) Prior Publication Data
US 2018/0238483 A1    Aug. 23, 2018

Related U.S. Application Data

(60) Provisional application No. 62/462,631, filed on Feb. 23, 2017.

(51) Int. Cl.
| | |
|---|---|
| *F16L 55/134* | (2006.01) |
| *F16L 55/124* | (2006.01) |
| *F16K 7/10* | (2006.01) |
| *F16L 55/11* | (2006.01) |
| *F16L 55/10* | (2006.01) |
| *G01F 15/18* | (2006.01) |
| *G01F 15/00* | (2006.01) |

(52) U.S. Cl.
CPC ............. *F16L 55/134* (2013.01); *F16K 7/10* (2013.01); *F16L 55/1022* (2013.01); *F16L 55/1141* (2013.01); *F16L 55/124* (2013.01); *G01F 15/005* (2013.01); *G01F 15/185* (2013.01)

(58) Field of Classification Search
CPC . F16L 55/134; F16L 55/1022; F16L 55/1141; F16L 55/124; F16K 7/10; G01F 15/005; G01F 15/185
USPC ........................................................ 138/93
See application file for complete search history.

(56) References Cited

U.S. PATENT DOCUMENTS

| | | | | |
|---|---|---|---|---|
| 1,760,750 A | * | 5/1930 | Goodman ................. | F16K 7/10 138/93 |
| 3,564,103 A | * | 2/1971 | Brachschob ........... | H05B 7/085 373/82 |
| 3,841,355 A | * | 10/1974 | Laner ........................ | F16K 7/10 138/89 |
| 3,842,864 A | * | 10/1974 | Riegel ...................... | F16K 7/10 138/93 |

(Continued)

*Primary Examiner* — Craig M Schneider
*Assistant Examiner* — David R Deal
(74) *Attorney, Agent, or Firm* — Pauley Erickson & Swanson

(57) ABSTRACT

Systems and methods for shutting off or stopping fluid flow through a pipe are provided. An inflatable bag stopper assembly is inserted through an opening into the pipe. The assembly includes one or more inflatable bags with each inflatable bag having a check valve positioned at an inlet. In inflatable bag stopper assemblies of two or more inflatable bags, the inflatable bags are connected in series. The inflatable bag stopper assembly is inflated such that the inflatable bag or bags act or serve to obstruct, block, close, or otherwise effectively foreclose passage of the fluid through the pipe.

7 Claims, 6 Drawing Sheets

(56) References Cited

U.S. PATENT DOCUMENTS

| | | | | |
|---|---|---|---|---|
| 4,155,373 | A | * | 5/1979 | DiGiovanni .............. F16K 7/10 137/15.15 |
| 5,439,032 | A | * | 8/1995 | Petrone ................ F16L 55/124 137/318 |
| 5,791,364 | A | * | 8/1998 | Petrone .................. F16K 43/00 137/15.14 |
| 6,263,896 | B1 | * | 7/2001 | Williams ................. F16K 7/10 137/15.15 |
| 6,901,966 | B2 | * | 6/2005 | Onuki ................... F16L 55/134 138/90 |
| 7,520,301 | B2 | * | 4/2009 | Ord ....................... F16L 55/134 138/89 |
| 7,886,773 | B2 | | 2/2011 | Mainzer |
| 8,800,601 | B2 | | 8/2014 | Mainzer |
| 9,416,908 | B2 | * | 8/2016 | Champlone ........... F16L 55/134 |
| 2006/0042708 | A1 | * | 3/2006 | Stowe .................... F16L 35/00 138/89 |
| 2010/0089477 | A1 | * | 4/2010 | Grobelny ............. F16L 55/134 138/93 |

\* cited by examiner

DETACHABLE SYSTEM TO SHUT OFF PRESSURE FLOW IN PIPES

CROSS REFERENCE TO RELATED APPLICATIONS

This application claims the benefit of U.S. Provisional Patent Application, Ser. No. 62/462,631, filed on 23 Feb. 2017. The Provisional Application is hereby incorporated by reference herein in its entirety and is made a part hereof, including but not limited to those portions which specifically appear hereinafter.

BACKGROUND OF THE INVENTION

Field of the Invention

This invention relates generally to the shutting off of pressure flow in or through pipes and, more particularly, to systems and methods for permanently shutting off pressure flow in or through pipes.

Description of Related Art

Existing methods to shut off utility (e.g., gas, water, etc.) transmission or service lines typically involve breaking up pavement such as streets and/or sidewalks and excavating down to the service line. Heavy equipment is deployed to stop the flow of fluid through the line and cut out a section of the pipe and cap or close a valve at the utility main. After the flow has been stopped, the process typically requires the backfilling of the excavation and restoring the pavement to proper transportation conditions, e.g., to allow appropriate vehicle and/or pedestrian travel.

SUMMARY OF THE INVENTION

The subject development involves systems and methods for permanently shutting off pressure flow in or through pipes, such as preferably natural gas service lines, as described in more detail below.

In accordance with one aspect of the subject development, there is provided a system for shutting off fluid flow through a pipe. In one embodiment, such a system includes an inflatable bag stopper assembly including at least one inflatable bag disposed in the pipe. A check valve is positioned at an inlet of the at least one inflatable bag. A detachable connection is provided to the inflatable bag stopper assembly. The system further includes a cap positioned over an end of the pipe.

In inflatable bag stopper assemblies of two or more inflatable bags, the inflatable bags are preferably connected in series.

If desired, a plug element can be disposed in the pipe following the at least one inflatable bag disposed in the pipe, after the inflation thereof.

If desired, a solid foam element can be disposed in the pipe following at least one inflatable bag, after the inflation thereof.

A system for shutting off flow of natural gas through a pipe is provided in another embodiment. Such a system includes at least first and second inflatable bags connected in series disposed in the pipe. A first check valve is positioned at an inlet of the first inflatable bag and a second check valve is positioned at an inlet of the second inflatable bag. A detachable connection to at least one of the first and second inflatable bags is also provided. A plug element can be disposed in the pipe following the at least one or more inflatable bags connected in series disposed in the pipe, after the inflation thereof. A cap is positioned over an end of the pipe.

In accordance with another aspect of the subject development, a method for stopping fluid flow through a pipe is provided. In one embodiment, such a method involves inserting a specifically designed and constructed inflatable bag stopper assembly through an opening into the pipe. The specifically designed and constructed inflatable bag stopper assembly desirably includes at least at least one inflatable bag and a detachable connection, with the at least one inflatable bag having a check valve positioned at an inlet thereto. The at least one inflatable bag is in inflation communication with an inflation medium from an inflation medium source via one or more inflation lines. At a desired or selected point in time, the inflatable bag stopper assembly is sufficiently inflated so as to appropriately stop fluid flow through the pipe.

The subject development is unique due to the capability of inflatable bag stopper assembly such as composed of one or more inflatable bags which upon inflation stop or discontinue the flow of fluid in or through the pipe, with the inflated bag or bags, e.g., stoppers, being left in place in the service line. The use of at least one and, in some preferred embodiments, two bags in series along with check valves as backflow preventers allow this to occur. In addition, the use of expandable foam within the system allows for stopping off fluid flows at higher pressures and creates a more permanent stop.

As used herein, references to a "pipe" or pipes are to be understood to generally refer to hollow conduits generally but not necessarily limited to hollow conduits of cylindrical form and such as formed of metal, wood, or other material and used for the conveyance of a fluid material such as a gas, liquid, or combination or mixture thereof. Typical or common fluid materials passed through or transmitted via pipes include water, gas (e.g., natural gas or methane), steam, petroleum, for example.

BRIEF DESCRIPTION OF THE DRAWINGS

These and other objects and features of this invention will be better understood from the following detailed description taken in conjunction with the following drawings.

DESCRIPTION OF PREFERRED EMBODIMENTS

Figure 1:
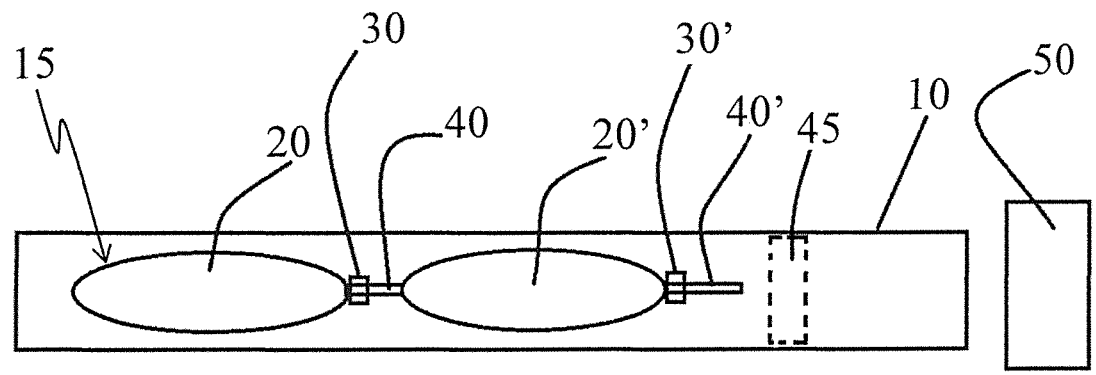
FIG. 1 is a schematic of one embodiment of the subject invention.

It is desirable to terminate utility (e.g., gas, water, etc.) transmission or service lines without the need to excavate. As detailed below and in accordance with one preferred embodiment of the invention, a saddle clamp with a ball valve, and a stuffing box with an option for a nitrogen purge vent is connected to the subject service line. A drill assembly is attached to the stuffing box. The pipe or fitting is next preferably drilled out using a hole-saw and the drill assembly is removed. Similar processes are shown and described in U.S. Pat. Nos. 7,886,773 and 8,800,601. The disclosures of each of these patents are fully incorporated herein by reference.

According to a preferred embodiment of the invention, as detailed below, a bag launch tube is preferably attached to the stuffing box which is connected to the pipe 10. As shown schematically in FIG. 1, using an inflation line, an inflatable bag stopper assembly 15 such as composed of multiple inflatable bags (e.g., first and second inflatable bags 20 and 20') are preferably deployed in series into the pipe 10. The bags 20 and 20' are preferably connected together through tubes 40 and 40'. Check valves 30 and 30' are preferably positioned between the inflatable bags 20 at an inlet end of each of the respective inflatable bags 20 and 20'.

The inflatable bags 20 and 20' are next inflated with a suitable inflation medium such as air or expandable foam, for example. The inflatable bags 20 and 20' are next preferably disconnected by the operator from the inflation medium supply by pulling on an inflation line back towards the operator. The inflated bags 20 and 20' thereby remain in place in the pipe 10. Once inflated, the flow of fluid in or through the pipe is stopped as the inflated bags act or serve to obstruct, block, close, or otherwise effectively foreclose passage of the fluid therethrough.

If desired, a plug or solid piece of foam 45 may be inserted into the pipe 10 to act as a dam. Finally, a cap 50 is used to cap off the service line for a permanent stop.

In practice, the incorporation and use of an inflatable stopper assembly such as described above and incorporating first and second inflatable bags connected in series disposed in the pipe and with a respective check valve positioned at the inlet of each of the inflatable bags is desirably effective to completely foreclose passage of fluid through the subject pipe.

Figure 2:
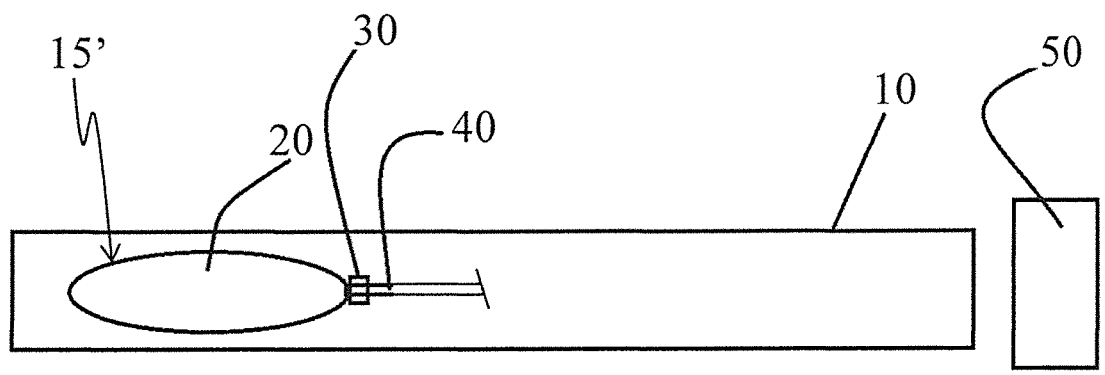
FIG. 2 is a schematic of another embodiment of the subject invention.

While the invention has been described above making reference to an inflatable bag stopper assembly such as composed of multiple inflatable bags preferably deployed in series into the pipe, the broader practice of the invention is not necessarily so limited. For example, FIG. 2 illustrates an alternative embodiment wherein an inflatable bag stopper assembly 15' is composed of single inflatable bag 20 having a check valve 30 at the inlet thereof is inserted into the pipe 10.

Similar to the embodiment shown in FIG. 1, if desired, a plug or solid piece of foam (not shown) may be inserted into the pipe 10 to act as a dam. Finally, a cap 50 is used to cap off the service line for a permanent stop.

The incorporation and use of an inflatable stopper assembly composed of a single inflatable bag having a check valve positioned at the inlet thereof can desirably achieve at least substantially complete (e.g., greater than 99%) shut off of fluid flow through a subject pipe.

In at least some embodiments, the incorporation and use of an inflatable stopper assembly composed of a single inflatable bag having a check valve positioned at the inlet thereof may successfully achieve complete (i.e., 100%) shut off of fluid flow through a subject pipe.

For a better understanding of the practice of the subject invention, reference is now made to FIGS. 3-7. While these figures illustrate the application and practice of the invention relative to a pipe elbow, those skilled in the art and guided by the teachings herein provided will understand and appreciate that the broader practice of the subject invention is not necessarily so limited as the invention can, if desired, be suitably applied to other pipe configurations or arrangements such as known in the art.

Figure 3:
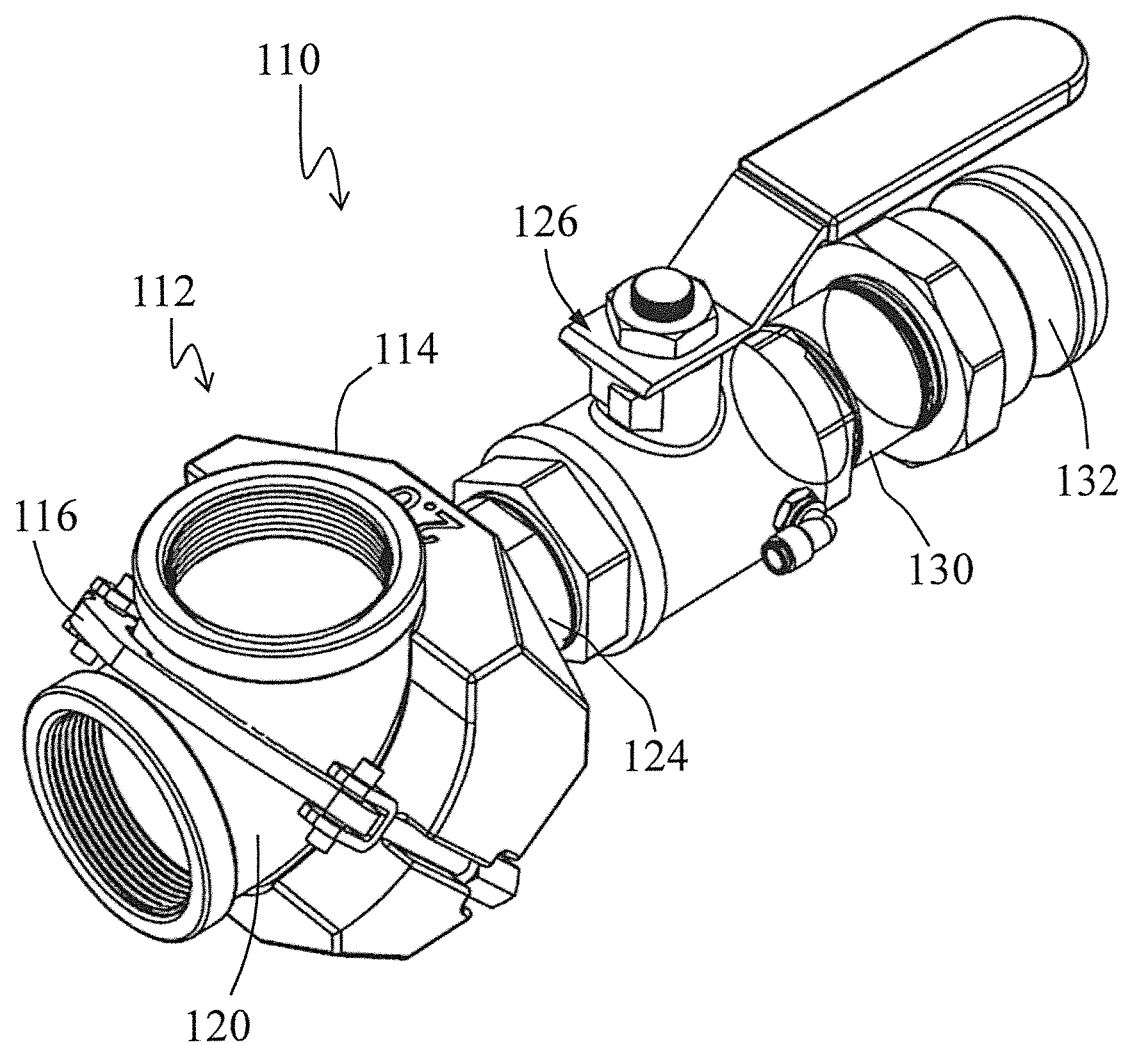
FIG. 3 is a fragmentary perspective view of a saddle clamp and pipe arrangement such as for use in the practice of one embodiment of the invention.

More particularly, FIG. 3 shows a saddle clamp and pipe arrangement, generally designated by the reference numeral 110, such as for use in the practice of one embodiment of the invention. In this illustrated embodiment, a saddle clamp 112 composed of a saddle 114 and an elbow clamp 116 are applied to a pipe elbow 120. The saddle clamp 112 includes a machined pipe nipple 124 connected to a ball valve 126. The ball valve 126 includes a pipe nipple 130 connected to a cam lock fitting 132 or the like.

Figure 4:
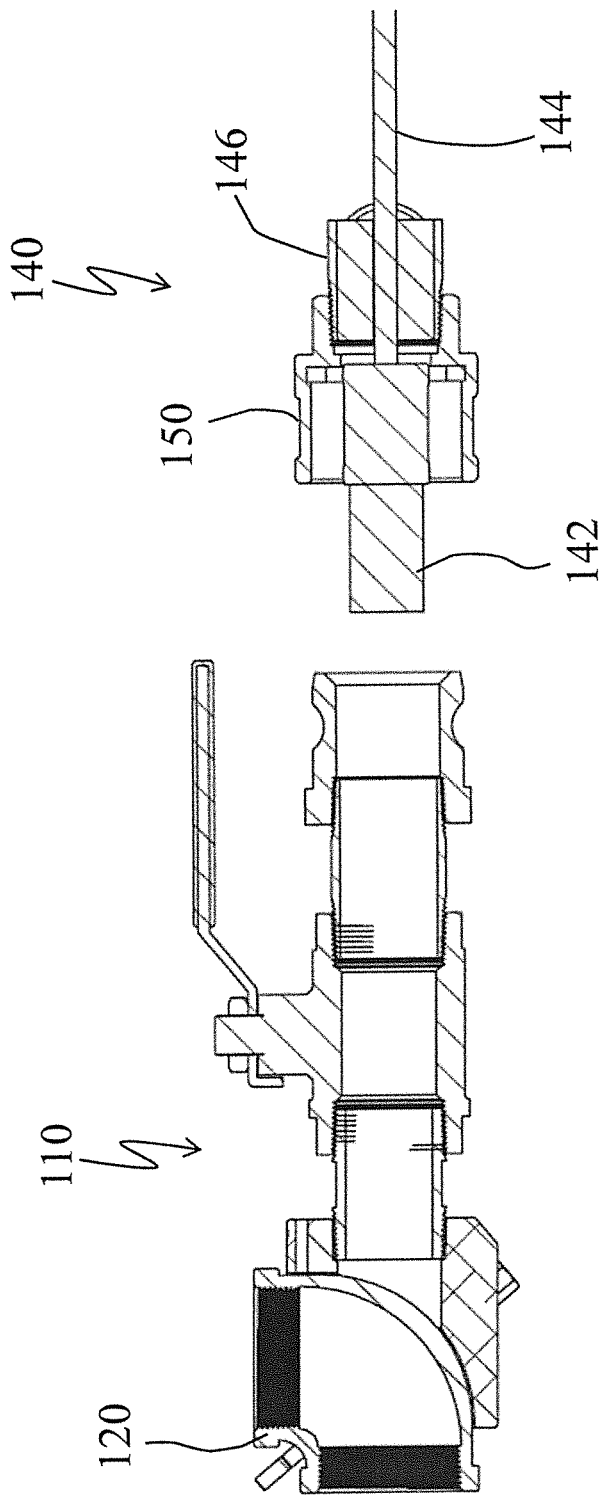
FIG. 4 is a fragmentary partially exploded cross sectional view of the saddle clamp and pipe arrangement shown in FIG. 3 with an associated drill or cutter assembly in accordance with one embodiment.

FIG. 4 illustrates the saddle clamp and pipe arrangement 110 together with an associated drill or cutter assembly 140 in accordance with one embodiment. The drill assembly 140 includes a hole saw 142 or other suitable cutting element joined or connected to a drill rod 144, such as via a drill rod seal 146 or the like. The drill or cutter assembly 140 may desirably include a cam lock fitting 150 or the like such as to mate or otherwise appropriately connect or join with the saddle clamp and pipe arrangement 110. The drill or cutter assembly 140 may subsequently be operated in a known manner to create or form an appropriate opening or hole into the pipe elbow 120 and with the assembly 140 being subsequently removed.

Figure 5:
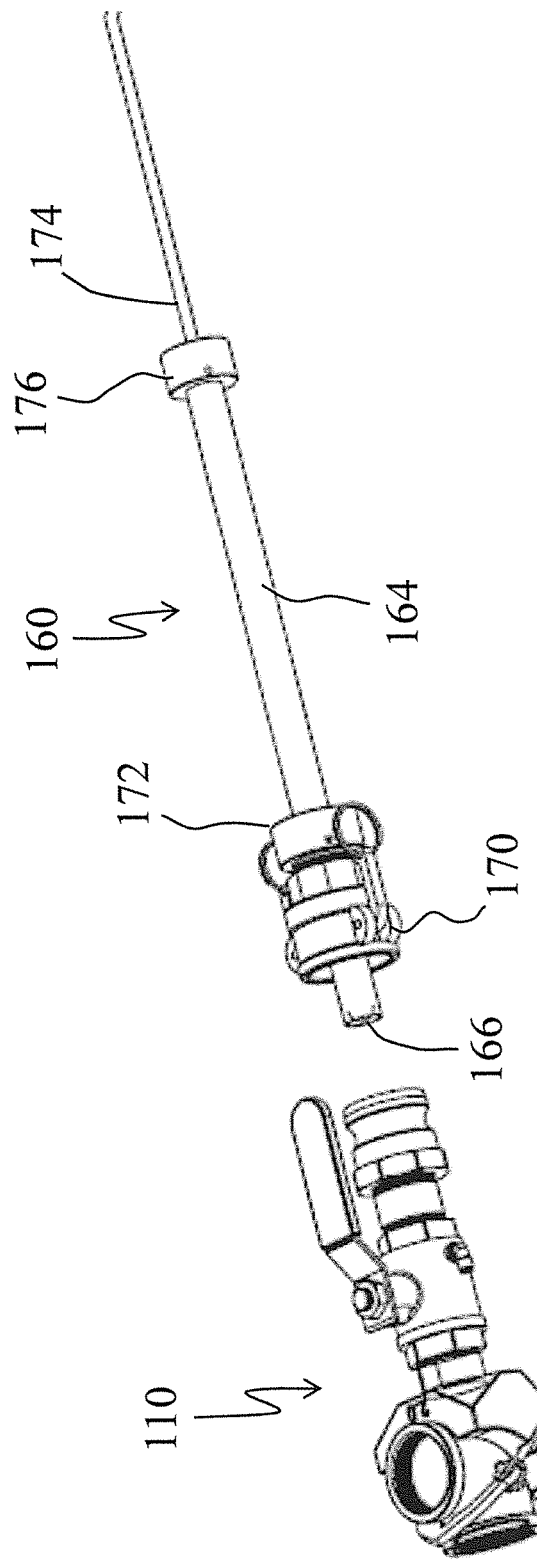
FIG. 5 is a fragmentary partially exploded perspective view of the saddle clamp and pipe arrangement shown in FIG. 3 with an associated launch tube assembly in accordance with one embodiment.

As shown in FIG. 5, a bag launch tube assembly 160 can subsequently be attached to the saddle clamp and pipe arrangement 110. The bag launch tube assembly 160 includes a launch tube 164 such as loaded or containing an inflatable bag stopper assembly 166 such as described above. The bag launch tube assembly 160 may desirably include a cam lock fitting 170 or the like such as to mate or otherwise appropriately connect or join with the saddle clamp and pipe arrangement 110. The bag launch tube assembly 160 may include a launch tube seal 172 and is desirably joined or connected to or with an air line 174 or the like source of inflation medium with a suitable seal 176.

Figure 6:
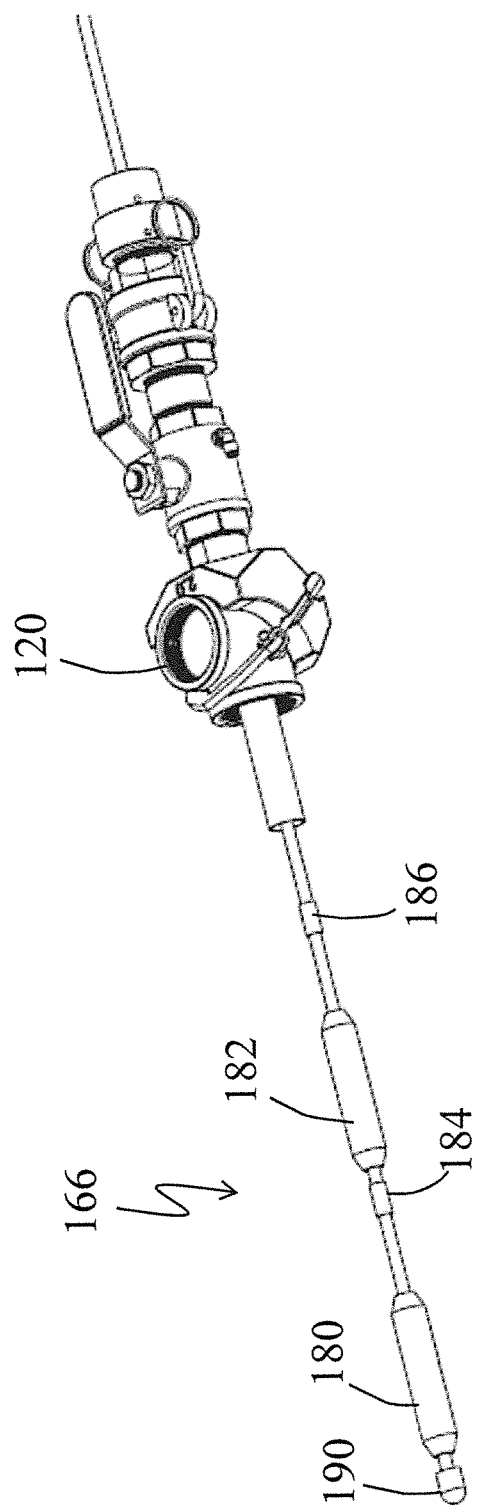
FIG. 6 is a fragmentary perspective view of the saddle clamp, pipe and launch tube assembly shown in FIG. 5 now showing the inflatable bag stopper assembly inserted through and into the pipe in accordance with one embodiment.
Figure 7:
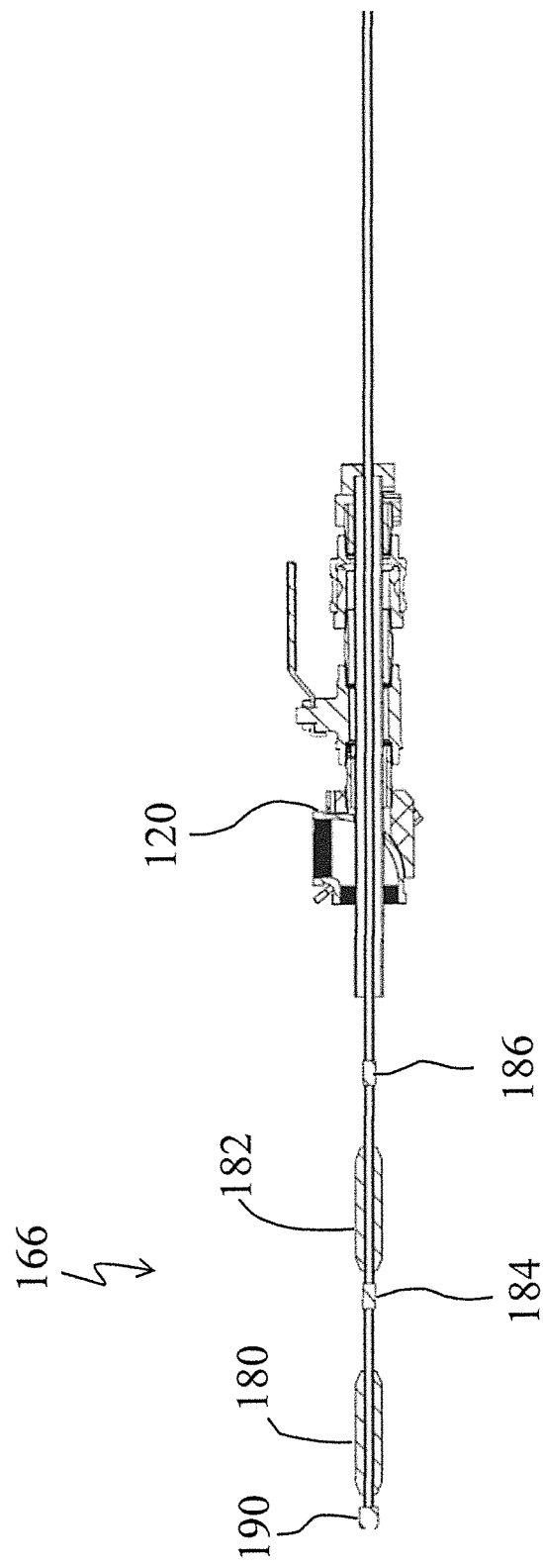
FIG. 7 is a simplified cross sectional view corresponding to the arrangement shown in FIG. 6.

As shown in FIG. 6 and FIG. 7, the inflatable bag stopper assembly 166 such as composed of a first inflatable bag 180 and a second inflatable bag 182 connected in series, with a first check valve 184 positioned at an inlet of the first inflatable bag 180 and a second check valve 186 positioned at an inlet of the second inflatable bag 182 are disposed in the pipe. If desired, a suitable bag lead 190 or the like can be disposed in advance of the first inflatable bag 180.

As identified above, once the inflatable bags have been appropriately inflated or filled, the inflatable bag stopper assembly can be preferably disconnected by the operator from the inflation media supply by pulling on the inflation line back towards the operator. The inflated bags remain in place in the pipe. Once inflated, the flow of fluid in or through the pipe is stopped as the inflated bags act or serve to obstruct, block, close, or otherwise effectively foreclose passage of the fluid therethrough.

It is to be understood and appreciated that an inflatable bag stopper assembly that includes a single inflatable air bag, such as described above and shown in FIG. 2, for example, can be incorporated and utilized in a similar arrangement.

The described invention comprises an inexpensive, fast, and safe way to stop off gas, water and other service lines, with a temporary or permanent stop, and without a need to excavate.

Those skilled in the art and guided by the teachings herein provided will understand and appreciate that the subject development can be suitably applied to a wide variety of specific applications. For example, while the subject development has been discussed and described above making specific reference to pipes or fluid communication conduits which are used for the conveyance of natural gas or the like, the broader practice of the subject development is not necessarily limited to or by the specific or particular fluid or fluids (for example, including gas, liquid, and gas/liquid combinations and/or mixes) being passed through, communicated or conveyed by a pipe or conduit.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A system for shutting off fluid flow through a pipe, the system comprising:
    an inflatable bag stopper assembly comprising at least one inflatable bag disposed in the pipe;
    a check valve positioned at an inlet of the at least one inflatable bag;
    a detachable connection to the inflatable bag stopper assembly;
    a cap positioned over an end of the pipe; and
    a solid foam dam element disposed in the pipe following at least one inflatable bag, after the inflation thereof.

2. A system for shutting off fluid flow through a pipe, the system comprising:
    an inflatable bag stopper assembly comprising at least one inflatable bag disposed in the pipe;
    a check valve positioned at an inlet of the at least one inflatable bag;
    a detachable connection to the inflatable bag stopper assembly; and
    a cap positioned over an end of the pipe,
    wherein the inflatable bag stopper assembly comprises at least first and second inflatable bags connected in series disposed in the pipe with a first check valve positioned at an inlet of the first inflatable bag and a second check valve positioned at an inlet of the second inflatable bag.

3. The system of claim 2 wherein a detachable connection to the inflatable bag stopper assembly comprises a detachable connection to at least one of the first and second inflatable bags.

4. A system for shutting off flow of natural gas through a pipe, the system comprising:
    at least first and second inflatable bags connected in series disposed in the pipe;
    a first check valve positioned at an inlet of the first inflatable bag and a second check valve positioned at an inlet of the second inflatable bag;
    a detachable connection to at least one of the first and second inflatable bags;
    a plug element disposed in the pipe following the at least one or more inflatable bags connected in series disposed in the pipe, after the inflation thereof; and
    a cap positioned over an end of the pipe.

5. The system of claim 4 wherein the plug element comprises a solid foam dam element disposed in the pipe following the at least first and second inflatable bags connected in series disposed in the pipe, after the inflation thereof.

6. The system of claim 4 wherein the at least first and second inflatable bags are inflatable with at least one of air or an expandable foam.

7. The system of claim 4 wherein the at least first and second inflatable bags are inflated with an expandable foam.

* * * * *